United States Patent [19]
Henderson

[11] 3,723,565
[45] Mar. 27, 1973

[54] OLEFIN FEED PURIFICATION IN AN ALKYLATION PROCESS

[75] Inventor: Miles L. Henderson, Bartlesville, Okla.

[73] Assignee: Phillips Petroleum Company, Bartlesville, Okla.

[22] Filed: Aug. 19, 1971

[21] Appl. No.: 173,069

[52] U.S. Cl..............................................260/683.43
[51] Int. Cl..............................................C07c 3/52
[58] Field of Search.........260/683.43, 683.4, 683.47, 260/683.48, 683.49, 683.53, 683.57, 683.58, 683.59, 683.61, 683.62

[56] References Cited
UNITED STATES PATENTS
2,286,504   6/1942   Parker............................260/683.61

Primary Examiner—Delbert E. Gantz
Assistant Examiner—G. J. Crasanakis
Attorney—Young and Quigg

[57] ABSTRACT

An olefin stream, e.g., ethylene, produced, for example, by naphtha cracking and containing methane and hydrogen impurities is absorbed from the major portion of the impurities using a portion of the subsequently produced alkylate. Alkylate containing absorbed ethylene is flashed, the liquid remaining after flashing is passed to a fractionation column from which an isoparaffin such as isobutane is removed and admixed with flashed vaporous ethylene, and the mixture is charged as feed to an alkylation process.

5 Claims, 1 Drawing Figure

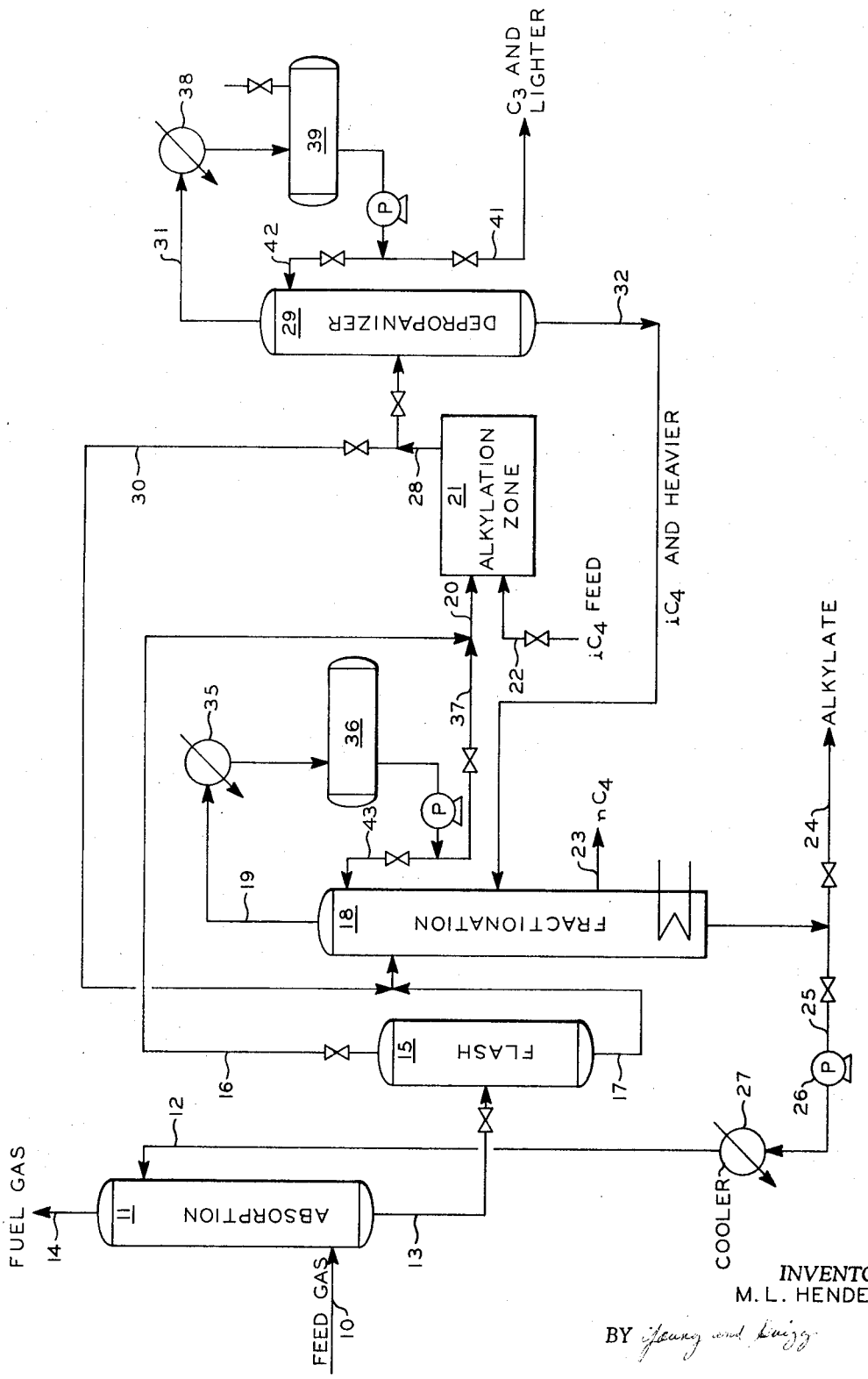

OLEFIN FEED PURIFICATION IN AN ALKYLATION PROCESS

This invention relates to the separation and conversion of hydrocarbons. In accordance with one aspect, this invention relates to a purification and conversion process wherein olefin feeds comprising ethylene containing lower boiling impurities are freed of the impurities using a portion of subsequently produced product from the purified olefin stream. In accordance with another aspect, ethylene produced, for example, by naphtha cracking and containing methane and hydrogen impurities is absorbed from a major portion of the impurities using a portion of subsequently produced alkylate as the absorbent. In accordance with another aspect, an absorbent comprising alkylate and absorbed ethylene is flashed to separate an ethylene-rich vapor which is combined with a liquid isoparaffin such as isobutane and the mixture is utilized as the feed for an alkylation process to produce alkylate which is subsequently used in part as the absorbent to recover ethylene from an olefin-containing stream. In accordance with a further aspect, this invention relates to a process for the production of DIP alkylate wherein at least a portion of the DIP alkylate product is used to absorb ethylene from an olefin-containing stream containing lower boiling impurities and the absorbed ethylene is separated from the absorbent and used as the olefin feed for the DIP alkylation.

Processes for the alkylation of hydrocarbons, for example, alkylation of isobutane with ethylene to produce diisopropyl, by means of catalysts such as aluminum chloride-hydrocarbon complex are well known to the art. Also as well known to the art, it is desirable to operate the DIP alkylation unit with high purity ethylene feed.

In accordance with the invention, it has been found that ethylene streams containing low boiling impurities can be substantially freed of these impurities by contacting with a DIP alkylate, as absorption liquid (or absorbent), under absorption conditions.

Accordingly, an object of this invention is to provide an improved purification system for olefin streams.

Another object of this invention is to provide an improved process for the alkylation of isoparaffins with olefins.

A further object of this invention is to provide an improved and economical process for the purification of alkylation olefin feeds.

Other aspects, objects and the several advantages of the invention will be apparent to those skilled in the art upon reading the specification, the drawing and the appended claims.

In accordance with the invention, olefin streams comprising ethylene and containing low boiling impurities are subjected to absorption by contact with an alkylate product to selectively absorb ethylene from the impurities. The ethylene can be separated from the alkylate absorbent for use as a source of olefin in an alkylation process.

More specifically, in accordance with the invention, ethylene produced, for example, by naphtha cracking and containing methane and hydrogen impurities is absorbed from the major portion of the impurities using a portion of subsequently produced diisopropyl alkylate.

In accordance with a further embodiment of the invention, ethylene is absorbed from olefin-containing streams by contact with DIP alkylate product, the ethylene is flashed from the alkylate absorbent and passed to a DIP alkylation together with an isoparaffin such as isobutane. The liquid remaining after flashing the ethylene from the DIP alkylate absorbent is passed to a fractionation column and isobutane is recovered therefrom and combined with the flashed ethylene vapors and passed together to the DIP alkylation process.

A better understanding of the invention will be obtained by reference to the accompanying drawing which diagrammatically illustrates the absorption of ethylene from an olefin-containing stream by contact with a portion of the DIP alkylate in combination with the alkylation of ethylene and isobutane to form DIP alkylate.

Referring now to the drawing, an olefin-containing feed comprising ethylene and lighter materials such as methane and hydrogen is introduced into absorption zone 11 by way of line 10. As is illustrated in the drawing, the olefin-containing feed material is introduced near the base of absorption column 11 and absorbent comprising DIP alkylate is introduced near the top of absorption column 11 by way of line 12. DIP alkylate absorbent passes downwardly countercurrent to rising olefin-containing material and the ethylene is selectively absorbed by the alkylate and removed together as rich alkylate absorption liquid from the base of absorption column 11 by way of line 13. The lower boiling impurities comprising hydrogen and methane are removed overhead from absorption column 11 by way of line 14 and can be passed for further use, e.g., as fuel.

The ethylene-rich alkylate stream removed by line 13 from the base of absorption column 11 is passed to flash tank 15 wherein the ethylene is flashed overhead and removed by way of line 16. The liquid remaining is removed from tank 15 by way of line 17 and passed to an upper portion of fractionation zone 18.

Fractionation zone 18 is operated under conditions such that isobutane and lower boiling materials are removed overhead by way of line 19, cooled by condenser 35, passed to accumulator 36, and a portion of the liquid isobutane containing stream removed from accumulator 36 by valved line 37 is combined with vaporous ethylene in line 16 and the mixture thus formed comprising isobutane and ethylene is passed by way of line 20 as feed to DIP alkylation zone 21. Some of the liquid removed from accumulator 36 is passed by line 43 to zone 18 as reflux. Makeup or feed isobutane is introduced into zone 21 by way of line 22. Normal butane vapor is removed from a lower portion of zone 18 by way of line 23 and liquid alkylate product is removed from the base of zone 18 by way of line 24. If desired, line 23 can be omitted and normal butane and alkylate can be removed as liquid via line 25 as the absorption liquid, and via line 24 as bottom product, which is charged to a debutanizer, not shown.

In accordance with the invention, a portion of the alkylate product removed from the base of zone 18 is passed by way of line 25 through pump 26, cooler 27, and thence through line 12 for introduction as absorption liquid into the upper portion of absorption column 11.

The alkylation conditions of temperature, pressure, and ratio of reactants in zone 21 are well known, but these will ordinarily be: temperature, 120°F; pressure, 400 psig; hydrocarbon to catalyst volume ratio, 1:1; isobutane to ethylene mole ratio, 10:1; and the catalyst is an aluminum chloride-hydrocarbon complex in a conventional diisopropyl alkylate manufacturing operation.

In alkylation zone 21 the isobutane and the ethylene are contacted with a suitable catalyst such as aluminum chloride or aluminum chloride complex or other known catalyst under alkylation conditions in liquid phase to produce diisopropyl alkylate. The alkylate, together with propane, normal butane, and unreacted hydrocarbon, is removed from zone 21 by way of line 28 and passed in part to depropanizer column 29. The remainder of the alkylation effluent is passed by way of line 30 to fractionation zone 18 and introduced into line 17 together with the liquid removed from flash tank 15 and the mixture thus formed is introduced into zone 18. The amount of alkylation effluent passed to zone 29 is sufficient to rid the system of propane and lighter buildup. Alkylation zone 21 includes conventional catalyst separation and recycle means, not illustrated.

Depropanizer column 29 is operated under conditions of temperature and pressure such that propane and lighter materials are removed overhead by way of line 31, cooled by condenser 38, passed to accumulator 39, and a yield portion is passed by line 41 for further use as desired. Some of the liquid removed from accumulator 39 is passed by line 42 to zone 29 as reflux. Heavier materials comprising isobutane and heavier and removed as bottoms from column 29 by way of line 32 and returned to fractionation zone 18, and is introduced into an upper portion thereof for further separation thereof.

Typical operating conditions for the various zones described above are as follows:

Typical Operation

| Operating Conditions: | Ranges | Typical |
|---|---|---|
| Absorption Zone (11): | | |
| Pressure, psig | 400 to 700 | 500 |
| Temperature, °F. | −25 to 100 | 30 |
| Flash Zone (15): | | |
| Pressure, psig | 350 to 550 | 450 |
| Temperature, °F. | 50 to 150 | 130 |
| Fractionation Zone (18): | | |
| Pressure, psig | 115 to 175 | 150 |
| Top Temperature, °F. | 70 to 130 | 300 |
| Bottom Temperature, °F. | | 300 |
| Depropanizer (29): | | |
| Pressure, psig | 270 to 350 | 330 |
| Top Temperature, °F. | 90 to 135 | 95 |
| Bottom Temperature, °F. | 300 to 350 | 320 |

SPECIFIC EXAMPLE

An alkylation process is carried out in accordance with the flow described above in connection with the drawing. An ethylene feed is freed of methane and hydrogen by absorption with a DIP alkylate product produced from the purified ethylene and isobutane. The conditions employed for the various zones are set forth above.

The flow rates and compositions of the various streams are set forth below:

Flow Rates:

| | | |
|---|---|---|
| Vapor Feed to Absorber Stream (10), lbs./pay | | 701,700 |
| Composition | Mol % | |
| Hydrogen | 16 | |
| Methane | 39 | |
| Ethylene | 36 | |
| Ethane | 8 | |
| Proprylene (plus) | 1 | |
| | 100 | |
| Lean Absorption Oil (Alkylate) (Stream 12), Bbls./pay | | 7,300 |
| Fuel Gas (Stream 14), Lbs./Day | | 208,000 |
| Composition | Mol% | |
| Hydrogen | 33 | |
| Methane | 58 | |
| Remainder | 9 | |
| Flashed Vapors (Stream 16), Lbs./Day | | 227,660 |
| Composition | Mol% | |
| Hydrogen | 3 | |
| Methane | 30 | |
| Ethylene | 50 | |
| Ethane | 12 | |
| Heavier | 5 | |
| "Flashed" Liquid to Fractionator (Stream 17), Bbls./Day | | 9,550 |
| Feeds to AlCl$_3$ Complex Alkylation: From Fractionator (Stream 37), Bbls./Day | | 35,983 |
| Composition | Mol% | |
| Hydrogen | Trace | |
| Methane | 1.4 | |
| Ethylene | 5.6 | |
| Ethane | 1.4 | |
| Propylene | Trace | |
| Propane | 3.3 | |
| Isobutane | 85.1 | |
| Normal butane + | 3.2 | |
| Fresh Isobutane (Stream 22), Bbls./Day ($\pi$Vol.% IC$_4$) | | 3,720 |
| Catalyst to Hydrocarbon Vol. Ratio | 1:1 | |
| Isobutane to Olefin Mol Ratio | 10:1 | |
| Propane and Lighter (Stream 41), Lbs./Day (9 Vol. % Propane) | | 222,450 |
| DIP Alkylate (includes nC$_4$), (Stream 24), Bbls./Day | | 4,430 |
| DIP Alkylate (C$_4$-free), Bbls./Day | | 4,200 |
| RON, Clear, | | 102 |

The absorption zone 11 in the specific example has eight (theoretical) trays. The range of mole ratios of alkylate to ethylene will range from about 0.7 to about 1.5.

The alkylation reaction can be effected in the following ranges: temperature, 100° to 140°F.; pressure, 275 to 500 psig; hydrocarbon to catalyst volume ratio, 0.5:1 to 1.5:1; and isobutane to ethylene mole ratio of about 4:1 to about 13:1.

The invention uses produced alkylate or alkylate containing normal butane as the liquid absorption material 12 for removal of ethylene from gases 10 comprising ethylene, methane, and hydrogen, and effects removal of about 95 percent of the hydrogen and about 75 percent of the methane, with a minimum loss of ethylene and absorption oil in the off-gas 14. When isobutane is used as the liquid absorption fluid, operating the absorber 11 at the same conditions, a considerable quantity of valuable isobutane is lost overhead with the off-gas 14.

By the removal of the light inert gases 14 from ethylene, the flashed vapor 16 from flash zone 15 can easily be dissolved into the overhead accumulator liquid 37 from tower 18. This overhead vapor 19 can now easily be condensed to liquid using plant cooling water as the indirect heat exchange fluid in exchanger 35. This allows liquid feed to alkylation which is operated in liquid phase.

The flash step 15 eliminates the requirement for a stripping column for regeneration of ethylene-rich alkylate 13, and the operation is at a lower temperature than used in a rich-oil stripper.

I claim:

1. In an alkylation process wherein an isoparaffin is alkylated with an olefin feed stream in the presence of an alkylation catalyst, the improvement which comprises:
   a. purifying said olefin feed stream of lower boiling materials prior to being alkylated by contacting same under absorption conditions with at least a portion of the DIP alkylate recovered from the alkylation process to absorb ethylene from said lower boiling materials,
   b. flashing ethylene absorbed in step (a) from the DIP alkylate absorbent and passing said ethylene substantially freed of lower boiling materials as the olefin feed stream to the alkylation process for alkylation with an isoparaffin,
   c. contacting said olefin feed stream substantially freed of lower boiling materials and an isoparaffin stream comprising isobutane with an alkylation catalyst under alkylation conditions to produce an effluent comprising DIP alkylate and unreacted hydrocarbons,
   d. separating said DIP alkylate from said unreacted hydrocarbons, and
   e. passing at least a portion of said separated DIP alkylate to step (a) as the absorbent to purify said olefin feed stream.

2. A process according to claim 1 wherein separation in step (d) is effected by passing the alkylation effluent to a depropanizer wherein paraffin and lower materials are taken overhead and isobutane and heavier materials are removed as bottoms, and said bottoms is passed to a deisobutanizer column wherein isobutane is taken overhead and passed to said alkylation process and DIP alkylate is removed as bottoms.

3. A process according to claim 2 wherein said DIP alkylate absorbent substantially freed of ethylene following flashing is introduced into said deisobutanizer.

4. A process according to claim 1 wherein said olefin feed stream comprising ethylene is produced by naphtha cracking and contains methane and hydrogen as impurities, and the ethylene is absorbed therefrom by contact with a portion of the subsequently produced DIP alkylate.

5. A process according to claim 4 wherein the ethylene-rich DIP alkylate stream obtained from step (a) is flashed, the flashed ethylene vapor being taken overhead, and the liquid from the flashing is passed to a deisobutanizer zone from which cooled condensed isobutane is removed overhead and is admixed with the flashed ethylene-rich vapor, and the mixture thus formed is charged as liquid feed to the alkylation process.

* * * * *